Nov. 3, 1964
R. E. CROSS
3,155,217
TRANSFER MACHINE
Filed Dec. 21, 1961
4 Sheets-Sheet 1
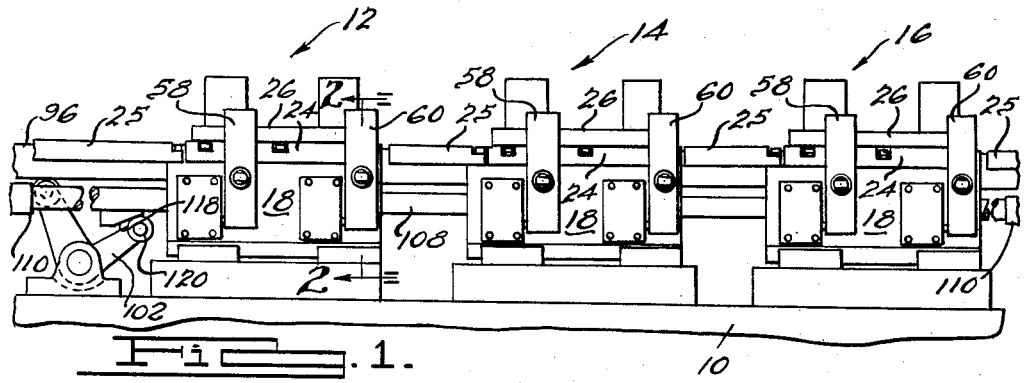
INVENTOR.
Ralph E. Cross.
BY
Harness, Dickey & Pierce
ATTORNEYS.

INVENTOR.
Ralph E. Cross.
BY
Harness, Dickey & Pierce
ATTORNEYS.

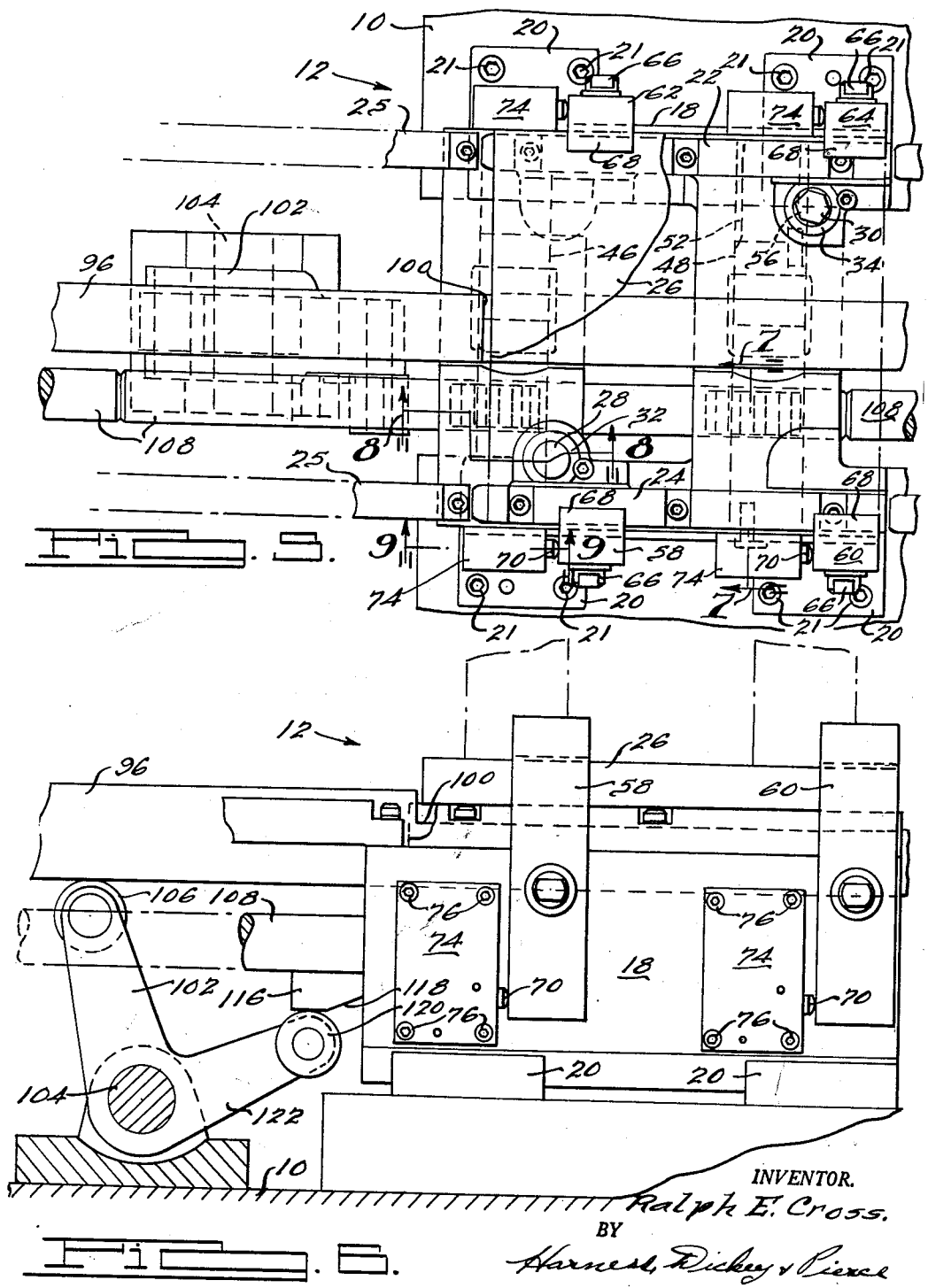

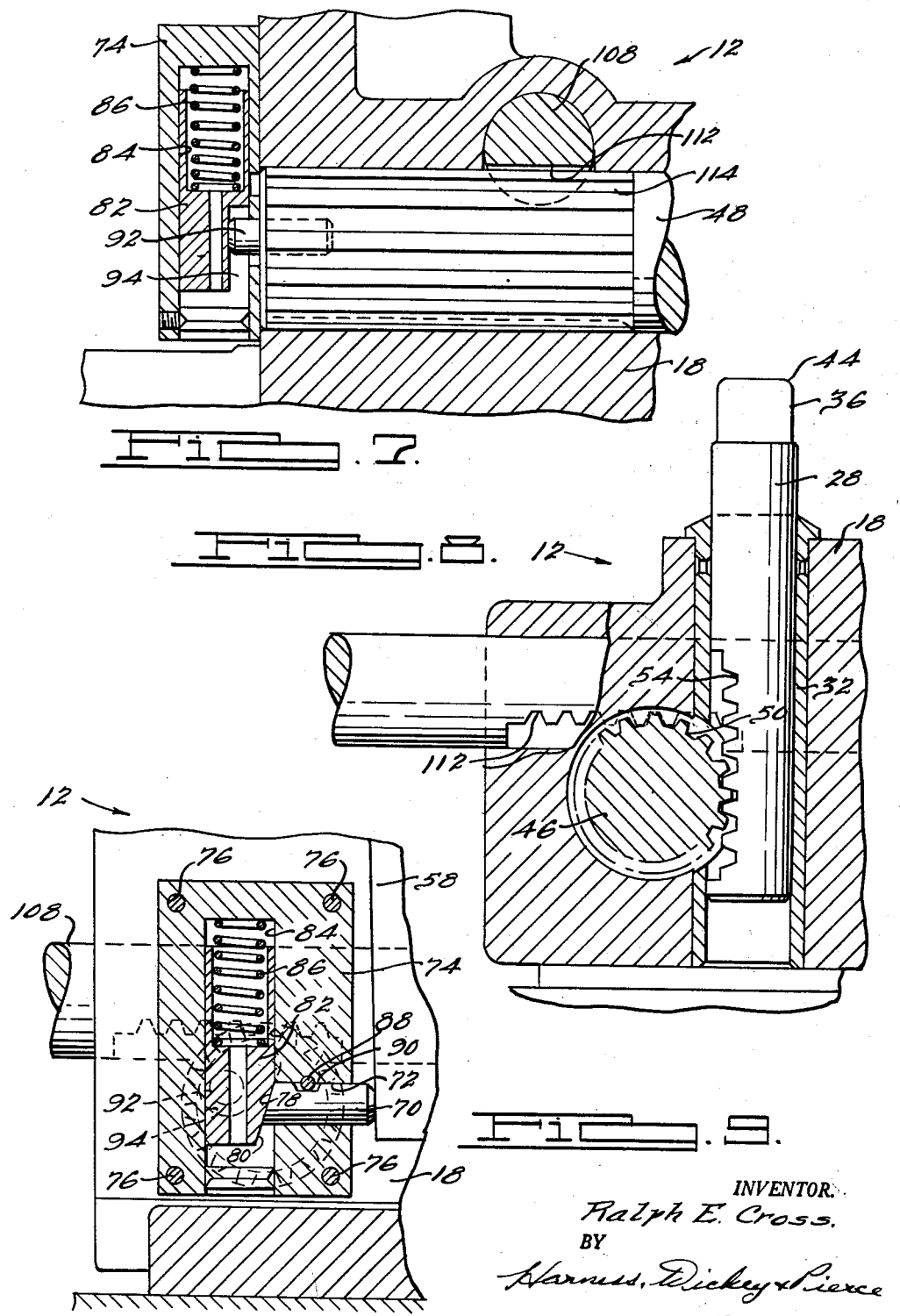

United States Patent Office 3,155,217
Patented Nov. 3, 1964

3,155,217
TRANSFER MACHINE
Ralph E. Cross, Grosse Pointe Shores, Mich., assignor to The Cross Company, Fraser, Mich., a corporation of Michigan
Filed Dec. 21, 1961, Ser. No. 161,200
17 Claims. (Cl. 198—19)

This invention relates to new and useful improvements in machine tools and more particularly to an improved means for mechanically actuating and coordinating the operation of the work locators, the work clamps and the work transfer device with which machine tools conventionally are equipped.

Heretofore it has been the usual practice to provide separate actuators for the work locators, the work clamps and the work transfer device and to interlock the same either mechanically or electrically through limit switches and the like so that they perform their intended operations sequentially in the proper order. Many machine tools and particularly transfer machines of the type here under consideration may have a large number of work stations so that an exceedingly large number of actuators is required and the control equipment therefor becomes very complex. In practice, this equipment has been a source of trouble and considerable maintenance usually is required to keep it in proper working order and to keep the consequential down time of the machine at a minimum.

An important object of the present invention is to provide novel means for mechanically connecting and correlating the operation of the work locators, the work clamps and the transfer device so as to eliminate a great deal of the control equipment heretofore required and to reduce the incidence of mechanical failure and of maintenance in use.

Another object of the invention is to provide a transfer machine which is simple in construction and more efficient in operation particularly with respect to the locating, clamping and transfer of workpieces than heretofore.

Other objects and advantages of the invention will be apparent during the course of the following description.

In the drawings forming a part of this specification and wherein like numerals are employed to designate like parts throughout the same:

FIGURE 1 is a side elevational view showing a fragmentary portion of a transfer machine and particularly illustrating three work stations equipped with the novel actuating and coordinating means for the locating, clamping and transfer means which comprises this invention;

FIG. 1a is a view similar to FIG. 1 but smaller in scale and particularly illustrating the bellcrank support and vertical actuator for the transfer bar;

FIG. 2 is an enlarged, tranverse vertical sectional view taken on the line 2—2 of FIG. 1;

FIG. 5 is a top plan view of that portion of the machine particularly illustrated in FIGS. 2–4;

FIG. 6 is a view similar to FIG. 3 but showing the transfer bar raised to engage workpieces in the stations preparatory to indexing thereof from one station to another in the machine;

FIG. 7 is an enlarged, fragmentary transverse vertical sectional view taken on the line 7—7 of FIG. 5;

FIG. 8 is an enlarged, fragmentary, longitudinal sectional view taken on the line 8—8 of FIG. 5, and FIG. 9 is an enlarged, fragmentary, longitudinal sectional view taken on the line 9—9 of FIG. 5.

Figure 3:
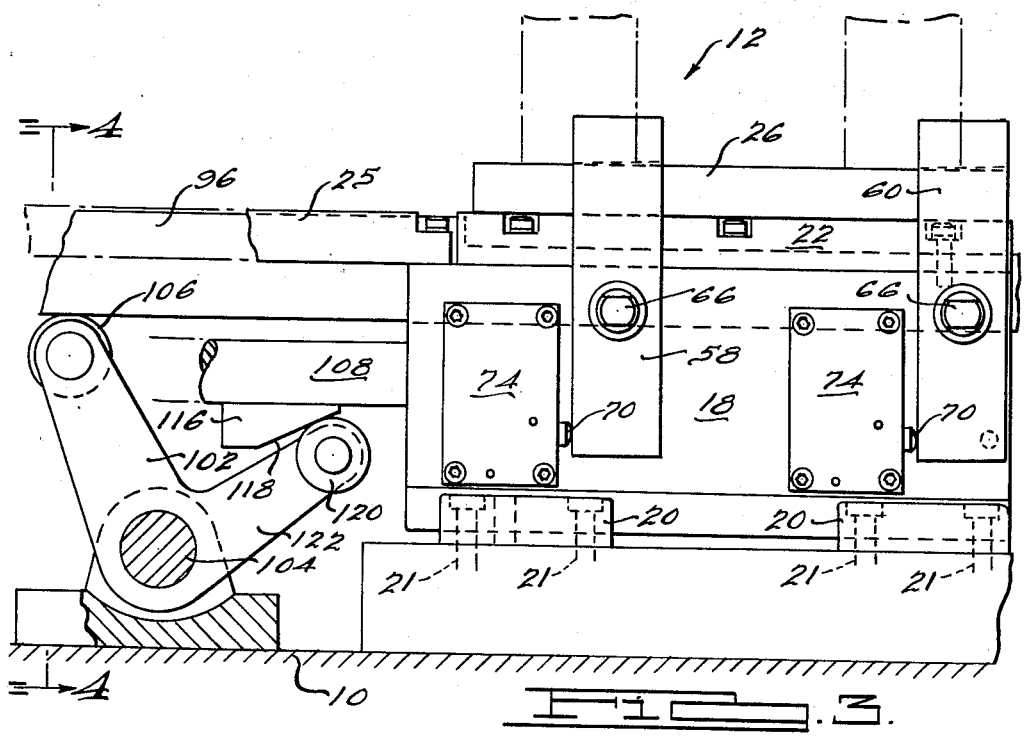
FIG. 3 is a side elevational view looking in the direction of the arrow 3 in FIG. 2 and showing the transfer bar lowered to disengage work in the stations.
Figure 4:
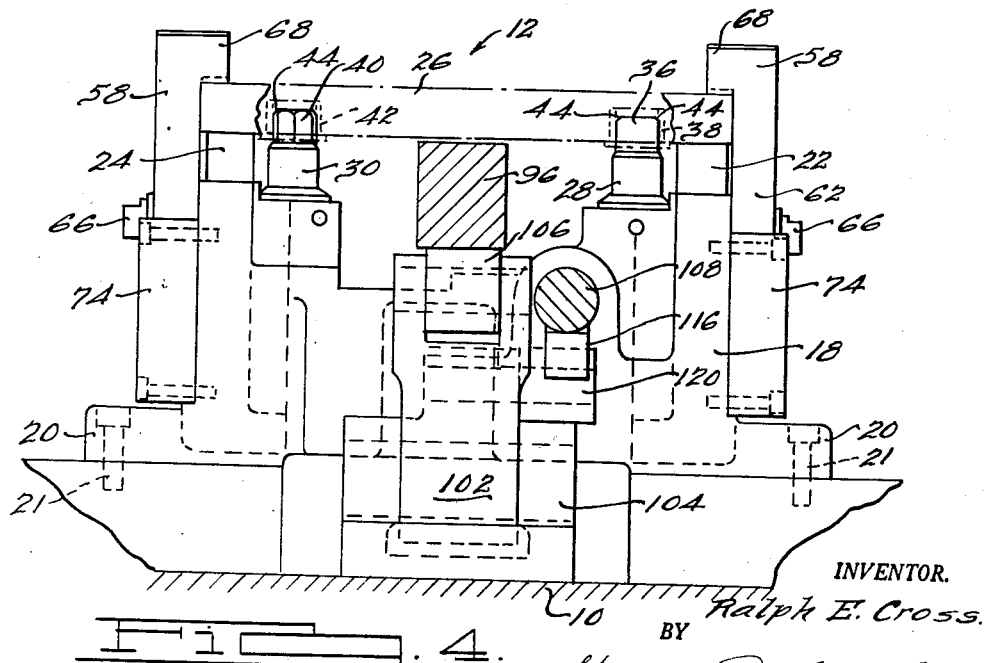
FIG. 4 is a transverse vertical sectional view taken on the line 4—4 of FIG. 3.

As suggested, the invention as here shown is incorporated in a transfer machine. These machines frequently are quite large and have a great many stations, arranged in-line and uniformly spaced with respect to each other. In practice, workpieces delivered to a loading station at one end of the machine are moved or indexed progressively by a suitable transfer device from station to station and eventually to an unloading station at the discharge end of the machine where they are removed from the machine for further processing or handling.

FIGURE 1 shows a fragmentary portion of a transfer machine having a bed 10 provided with three in-line, relatively spaced stations 12, 14 and 16. In some instances workpieces, per se, are transferred through the machine; but the work usually is mounted on suitable supporting pallets, and each workpiece remains on its respective pallet during its entire journey through the machine. The stations between the loading and unloading stations may all be work stations or some of them may be work stations and others may be idle stations. Machining or assembly operations may be performed on the workpieces in the work stations but work deposited in the idle stations merely waits for the machine to complete its cycle of operation preparatory to being transferred to the next station in the machine. The three stations 12, 14 and 16 here shown may be considered to be work stations although no tool heads or related mechanisms are shown. In this connection, however, it will be readily appreciated that the tools used in the work stations vary from station to station and from machine to machine depending upon the workpiece involved and the nature of the work to be performed thereon; and inasmuch as the tools and the tool operating mechanisms play no part in the present invention they are omitted from this disclosure in the interest of simplicity and clarity. Any type of tool or assembly device may be used at any work station according to conventional practice and in accordance with the exigencies of the particular situation. In any event, it will be apparent that the three stations 12, 14 and 16 here shown represent an intermediate part of the transfer machine. The workpieces are intended to move through the machine from left to right as viewed in FIG. 1, and it will be understood that a loading station and possibly other work and/or idle stations may be present at the left of the portion shown and that additional work and/or idle stations and an unloading station may be present at the right of the illustrated section. The instant invention is concerned only with the actuation of locating, clamping and transfer devices and in properly and automatically co-ordinating the operation thereof in the various stations and, inasmuch as these mechanisms are duplicated in each work station or in selected groups of stations throughout the transfer machine, the particular portion of the machine here shown is adequate to illustrate fully the concept and operation of the invention.

Each of the stations 12, 14 and 16 and indeed every station in the transfer machine, has a base 18 mounted on and suitably fastened to the bed 10. The particular base 18 here shown is in the form of a generally rectangular block having laterally extending bottom flanges 20 which overlie the bed 10 and are fastened thereto by suitable screws 21 or the like.

Laterally spaced, parallel ways 22 and 24 are provided on each base 18 and corresponding ways in the various stations are connected by bridging way sections 25. It will be observed that the connected ways and way sections are disposed in butting contiguous relation so that they collectively provide a smooth continuous track through the machine.

Pallets 26 travel through the machine on the ways 22, 24, and 25. The pallets 26 here shown are in the form of flat, rectangular plates; however, they may vary in size and shape, depending upon the nature of the workpiece supported thereby. Also, the pallets 26 conveniently may be equipped with work clamps or other appurtenances (not shown) for holding a workpiece thereon.

Each of the work stations 12, 14 and 16 is equipped with a pallet locating mechanism which may be conventional at least to the extent of its operation to position a pallet 26 in the station. Specifically, the locating mechanism here shown comprises a pair of vertically movable locating pins 28 and 30 disposed at diagonally opposite corners of the base 18 and inside the ways 22 and 24. The locating pin 28 is slidably mounted in a suitable bushing 32 provided in the base 18, as shown in FIGURE 8, and the locating pin 30 is similarly mounted in a bushing 34. A terminal portion 36 of accurately finished diameter on the locating pin 28 is adapted to enter a closely fitting bushing 38 in the underside of the pallet 26, and a terminal portion 40 on the upper end of the locating pin 30 is adapted to enter a closely fitting bushing 42 also in the under side of the pallet 26. By reason of the close fitting relationship between the terminal portions 36 and 40 and their bushings 38 and 42, insertion of the locating pins into the bushings locates the pallet accurately on the ways 22 and 24. The edges of the locating terminal portions 36 and 40 are beveled as at 44 to adjust or cam the pallet 26 into precise position in the event the bushings 38 and 42 are not aligned initially exactly with the pins 28 and 30. In this connection it will be appreciated that the pallet 26 is located initially quite accurately in the station by the transfer device and at most it is only necessary for the locating pins 28 and 30 to make small corrections and adjustments in the position of the pallet as they are pushed into the bushings 38 and 42. In any event, the final adjustment made by the locating pins 28 and 30 never exceeds the operating range of the beveled cam edges 44. In the particular form of the invention here shown, the locating terminal portion 36 of pin 28 is circular in transverse section and the locating terminal portion 40 of the pin 30 is octagonal in transverse section according to conventional practice.

Vertical sliding movement of the locating pins 28 and 30 is effected by rotatable cross shafts 46 and 48 journaled in the base 18 and having pinions 50 and 52 which mesh with racks 54 and 56 on the pins. In the form of the invention shown, the pinions 50 and 52 are formed integrally with the cross shafts 46 and 48 and the racks 54 and 56 are formed integrally with the locating pins 28 and 30; however, it will be readily apparent that these components can, if desired, be formed separately and suitably fastened to their respective parts.

After the pallet 26 has been properly located on the ways 22 and 24, it must be clamped to hold it in the located position during a machining or other operation on the workpiece carried thereby. Each station is here shown equipped with four clamps 58, 60, 62 and 64 which are arranged in pairs at opposite sides of and mounted on the base 18. In this connection, attention is directed to FIGURE 5 which shows the two clamps 58 and 60 on one side and adjacent the opposite ends of the base 18 in station 12, and clamps 62 and 64 at the other side of the base opposite clamps 58 and 60, respectively. All of the clamps 58, 60, 62 and 64 and the operating mechanisms therefor are identical in construction and operation and a detailed description of one therefore will suffice.

Each of the clamps 58, 60, 62 and 64 comprises an elongate bar mounted in a generally upright position at the side of the base 18 and as shown in FIG. 2 with reference to the clamps 60 and 64, each clamp is journaled on a pivot 66 fastened to and extending laterally from the base. All clamps extend above the base 18 and laterally inwardly extending clamping lugs 68 on the upper ends thereof are positioned to overlie the pallet 26 when the latter is positioned on the ways 22 and 24 by the locating pins 28 and 30. Sufficient clearance is provided between pallet 26 and the clamping lugs 68 so that the pallet is free to move on ways 22 and 24 when the clamps are in a free upright position. However, when the clamps are rocked on the pivots 66, the clamping lugs 68 thereof are moved into clamping engagement with the pallet 26, as shown in FIGURE 3, and the edge contact and wedging engagement thus established between the clamps and the pallet is particularly effective in holding the pallet.

As shown in FIGURE 3 with reference to clamps 58 and 60, each of the clamps is moved into clamping engagement with the pallet 26 by a plunger 70 at one side thereof, the plunger being slidably disposed in the horizontal bore 72 of a mounting block 74 which is fastened to the base 18 at one side of the clamp by screws 76. At the inner end thereof, each plunger 70 is formed with an inclined cam face 78. As shown in FIGURE 9 with reference to the clamp 58, and in each instance the cam face 78 is engaged by the correspondingly tapered cam face 80 of a cam slide 82 which is mounted for reciprocation in a vertical bore 84 provided in the mounting block 74. A helical spring 86 confined between the slide 82 and the inner end of the bore 84 exerts a constant downward pressure against the slide to drive the plunger 70 against the clamp 16.

Pressure thus exerted by the springs 86 against the clamps 58, 60, 62 and 64 through the plungers 70 and cam slides 82 rock the clamps on their pivots 66 and into engagement with the pallet 26. Thus, the springs 86 holds the clamps normally engaged with the pallet 26 and the tapered cam faces 78 and 80 hold the clamps normally locked in the clamping position. Pins 88 carried by the mounting blocks 84 and operating in longitudinally extending peripheral recesses 90 in the plungers 70 limit the travel of the plungers and consequently of the slides 82 and hold the clamp actuating parts assembled in the event the clamps or the mounting blocks 74 are removed from the base 18.

From the foregoing it will readily be apparent that a clamp operating mechanism is provided at the side of each clamp 58, 60, 62 and 64. The clamp operating mechanisms are identical in construction and operation so that the compression spring 86 in each of these mechanisms holds its respective clamp normally engaged with the pallet 26. Thus, unless otherwise restrained, all of the clamps 58, 60, 62 and 64 are engaged simultaneously with the pallet 26 to hold the latter securely on the ways 22 and 24 of the machine.

According to the present invention the two clamp operating mechanisms which serve clamps 58 and 62 are operated simultaneously to engage or release the clamps by eccentric pins 92 in the ends of the shaft 46, and the two clamp operating mechanisms which serve the clamps 60 and 64 are operated simultaneously to engage or release the clamps by eccentric pins 92 in the ends of the shaft 48. FIGURE 7 shows a pin 92 at one end of the shaft 48 and illustrates the co-operative relationship between the pin and the clamp operating mechanism which serves the clamp 60, and it will be understood there is a similar pin 92 at the opposite end of the shaft which is similarly related to the clamp operating mechanism which serves clamp 64. Each pin 92 extends into a recess 94 in the mounting block 74 with which it is associated (FIG. 7) and as shown in FIG. 9. The recess is elongated in form and is arranged with the longitudinal axis thereof inclined approximately 45° from the horizontal. It will be observed also that the recess 94 is substantially wider than the pin 92 so that in at least one position of the shaft 48 a lost motion connection is established between it and the cam slide 82. For instance, when the parts are disposed as shown in FIG. 9, the pins 92 are released from the cam slides 82 so that the compression springs 86 are free to advance the cam slides against the plungers 70 to engage the latches. However, if the cross shafts are rotated in a clockwise direction as viewed in FIG. 9, the pins 92 engage the cam slides 82 to lift the same against the springs 86 so as to release the plunger 70 and disengage the associated clamps from the pallet 26. Manifestly, the clamps will remain released from the pallet 26 as long as the cam slides 82 are held in a raised position and until the cross shafts are rotated in a reverse direction sufficiently to again release the slides.

The pallets 26 are indexed from station to station in the machine by a transfer bar 96 which extends lengthwise of the machine through a plurality of stations and below the ways 22 and 24. If the machine is sufficiently short a single transfer bar 96 may serve all of the stations in the machine. However, if necessary or desirable, a plurality of transfer bars may be provided, each serving a predetermined number of stations in the machine. Each transfer bar 96 is reciprocally actuated in any suitable or conventional manner as by hydraulic cylinders (not shown) and, if more than one transfer bar is employed, all of the actuating cylinders preferably are suitably interlocked for synchronous operation of the transfer bars. FIG. 1 shows a single transfer bar 96 extending entirely through the stations 12, 14 and 16 and, as shown in FIGURE 6, the transfer bar is provided with recesses 100 in the upper edge thereof which accommodates pallets 26 in the stations. It will be readily appreciated in this connection that the transfer bar 96 is provided with as many recesses 100 as there are pallets to be transferred and that each pallet is accommodated in a respective recess, as shown. Spaced bellcranks 102 pivotally mounted as at 104 on the bed of the machine support the transfer bar 96 (FIGURE 3) and the supporting arms of the bellcrank preferably carry anti-friction rollers 106 to facilitate sliding movement or reciprocation of the transfer bar. Only one bellcrank 102 is here shown, but it will be understood that at least two bellcranks are provided adjacent the ends of the transfer bar 96 and that these bellcranks mutually co-operate to hold the transfer bar in the horizontal position shown. Rocking movement of the bellcranks 102 raises or lowers the transfer bar 96. In FIG. 3 the transfer bar 96 is shown in lowered position and disengaged from the pallets 26, and in FIG. 6 the transfer bar is shown in raised position and engaged with the pallets.

According to the present invention, the locating pins 28 and 30 and the clamps 58, 60, 62 and 64 in each station are operated by a single actuator rod 108 mounted for reciprocation in the base 18 below the transfer bar 96 and laterally of the bellcranks 102. Each station in the machine is here shown equipped with a separate actuator rod 108 but the actuator rods of adjacent stations are butted as shown in FIGURE 5 so that they in effect operate as a single rod. Any desired number of actuator rods 108 may be operated as a group in this manner and all of the actuator rods in the group are reciprocated simultaneously by hydraulic cylinders 110 (FIG. 1). In each instance, the actuator rod 108 overlies the cross shafts 46 and 48 and the overlying portions of the rod are formed with rack sections 112 which mesh with pinions 114 on the cross shafts 46 and 48 as shown in FIGS. 2 and 9. Thus when the rod 108 is reciprocally actuated the rack sections 112 act on the pinions 114 to rotate the cross shafts 46 and 48 so as to operate the locating and clamping mechanisms simultaneously. Also, it will be noted that the actuator rods 108 are provided adjacent to the bellcranks 102 with depending cams 116, each of which has an inclined cam surface 118 positioned to engage an antifriction roller 120 on and extending laterally from the arm 122 of the bellcrank 102, with which it is associated.

In practice, the hydraulic cylinders 110 move the actuator rods 108 back and forth a fixed distance determined by the stroke of the pistons in the cylinders and equal to the distance between adjacent stations in the machine. As the actuator rods 108 move to the left as viewed in FIGURE 1, the cam faces 118 ride downwardly on and away from the rollers 120. This has the effect of lowering the transfer bar 96 as the weight of the transfer bar rocks the bellcranks counterclockwise as the bellcranks are released by the cams 116. As suggested, the transfer bar 96 is lowered sufficiently by this operation to release the pallets 26. Conversely, as the actuator rods 108 approach the limit of their travel to the right as viewed in FIGURE 1, the cam faces 118 act on the rollers 120 to rock the bellcranks 102 clockwise, and as the bellcranks rock in this direction they raise the transfer bar 96 sufficiently to receive the pallets 26 in the recesses 100.

In the operation of the device now described, it is assumed that the actuator rods 108 are at the extreme limit of this travel to the right as viewed in FIGURE 1, and in this position of the rods the locating pins 28 and 30 are fully retracted and the clamps 58, 60, 62 and 64 are released. Also, the cams 116 are in the position shown in FIGURE 6 to raise the transfer bar 96 preparatory to indexing of the pallets 26. With the parts thus positioned and pallets 26 confined in the recesses 100 of the transfer bar 96, the latter is actuated longitudinally to the right a distance equal to the spacing between the stations of the machine. Inasmuch as all the stations are uniformly spaced, this action advances all of the pallets engaged by the transfer bar one station in the machine. Suitable controls (not shown) are provided according to conventional practice to regulate the indexing movement so that the pallets 26 are positioned with relative accuracy in the stations to which they are transferred. In any event, the initial position of the pallets should be sufficiently accurate as to be within the range of the beveled edge surfaces 44 on the locating pins 28 and 30.

After the indexing operation is completed, the actuator rods 108 are pushed to the left as viewed in FIGURE 1. During the first increment of motion in this direction, the racks 112 acting on the pinions 114 of cross shafts 46 and 48 rotate the latter to raise the locating pins 28 and 30 into engagement with the pallets 26. The locating pins are not necessarily fully inserted at this time, but they do penetrate the closely fitting bushings 38 and 42 sufficiently to correct any slight misalignment of pallets. As suggested, the edge bevels 44 of the locating pins engage the locating bushings 38, 48 as the pins move into engagement with the pallets 26 to shift the pallets slightly if the latter are not positioned with sufficient preciseness by the transfer bar 96. In any event, after the locating pins 28, 30 enter the bushings 38 and 42, the pallets 26 are in the final adjusted position within the clearance limits provided between the locating pins and the bushings. During this part of the operating cycle, the cam slides 82 are lowered slightly by the eccentric pins 92 but this movement does not bring them into engagement with the plungers 70 so that the clamps 58, 60, 62 and 64 remain disengaged from the pallets during final adjustment of the latter by the locating pins. Also, during this part of the operation the cams 116 release the bellcranks 102 to lower the transfer bar 96.

During the next or intermediate increment of motion of the actuator rod 108 to the left, the racks 112 still acting through the pinions 114 on the cross shafts 46 and 48 continue to insert the locating pins 28 and 30 into the bushings 38 and 42, but this operation is without significant effect except perhaps to engage the pins more firmly with the pallets 26. Also, the eccentric pins 92 rotate downwardly sufficiently to bring the cam slides 82 into engagement with the plungers 70 and eventually to release the cam slides so that the full power of the compression springs 86 are available to engage the clamps 58, 60, 62 and 64 with the pallets 26 to hold the latter securely in the located position. The cams 116 simply move away from the cam rollers 120.

During the next and final increment of motion of the actuator rod 108 to the left, the racks 112 acting through the cross shafts 46 and 48 raise the locating pins 28 and 30 to the fully inserted position and the eccentric pins 92 fully release the cam slides 82 and move without effect in the diagonal recesses 94. Thus, the pin and slot connections between the cross shafts 46 and 48 and the cam slides 82 constitute lost motion connections which assure that all of the clamps 58, 60, 62 and 64 are fully engaged and which compensates for any slight variations in the mounting and operations of the clamp actuating mechanisms that otherwise might prevent precise simultaneous operation thereof. For this reason, it makes no difference whether the eccentric pins 92 release all of the cam slides 82 at precisely the same moment provided all of the cam slides are fully released by the time the actuator rod 108 reaches the extreme limit of its travel to the left. Also, during this final increment of motion of the actuator rod 108, the cams 116 simply continue to move away from the cam rollers 120. In this connection, it will be readily appreciated that the transfer bar 96 can be retracted to its initial position by sliding it to the left as viewed in FIG. 1 any time after it is lowered to release the pallets 26. Either simultaneously with or subsequently to the retraction of the transfer bar 96, work is performed on the workpieces in the work stations according to the exigencies of the particular situation.

After the work or other operations have been performed on the workpieces, the actuator rod 108 is moved longitudinally to the right to reverse the sequence of operations hereinabove described. During the first increment of motion to the right, the actuator rod 108 acting through the cross shafts 46 and 48 moves the eccentric pins 92 into engagement or substantially into engagement with the cam slides 82 and also retraction of the locating pins 28 and 30 from the locating bushings 38 and 42 is begun. During the next or intermediate increment of motion to the right, the cam slides 82 are raised by the eccentric pins 92 to release the plungers 70 and the clamps 58, 60, 62 and 64 and the locating pins 28 and 30 are retracted further. During the final increment of motion, the cams 116 engage the cam rollers 120 and rock the bellcranks 102 to raise the transfer bar 96 into engagement with the pallets 26, the locating pins 28 and 30 are fully retracted and disengaged from the pallet 26 and any clamps not fully released heretofore are released. In this connection it will be observed that substantial clearance is provided between the cam slides 82 and the upper ends of the bores 84 to compensate for any overtravel of the slides that may occur after the clamps are released. During this portion of the operation, however, the eccentric pins 92 approach the top center position so that relatively little upward motion is imparted to the cam slides for a given rotation of the cross shafts 46 and 48.

From the foregoing, it will be readily apparent that the mechanism hereinabove described operates the locating pins and the work clamps and also raises and lowers the transfer bar by reciprocal actuation of the single rod 108. By combining the various actuating parts in this manner, it is possible to eliminate separate actuator and control means heretofore required for operating these parts separately or in a combination less than the full combination here disclosed. A mechanically simpler construction is provided and a fewer number of parts is necessary to perform the total operations described than has been required heretofore. This in turn assures a more trouble-free operation of the machine and fewer shutdowns for servicing.

What is claimed is:

1. A machine tool having spaced in-line stations and ways extending through said stations, locators in each station engageable with a work carrying pallet in said station to position the same accurately therein, pivoted clamps in said stations engageable with said pallets to hold the same securely in the located position, clamp operating devices beside said clamps including spring actuated cam slides, and plungers actuated by said slides and bearing on said clamps to engage the same with said pallets, a transfer device including a vertically and horizontally movable transfer bar extending through said stations engageable with said pallets and operable to move the same from station to station on said ways, spaced bell cranks each arranged with one arm supporting said transfer bar and having cam followers on the other of said arms, a cross shaft journaled for rotation in each station, rack and pinion means connecting the cross shaft in each station with the locators in said station, means including eccentric pins in the ends of each cross shaft extending into elongate recesses in said cam slides and operative by rotation of said cross shaft to actuate said cam slides, said recesses being substantially wider than said pins to provide lost motion connections between said pins and said cam slides and being angularly disposed to actuate said cam slides in predetermined sequential relation with respect to said locators, and a reciprocable actuator rod extending through said stations having rotary driving connections with the cross shafts in said stations and cams engageable with the cam followers of said bell cranks to actuate the same to raise or lower said transfer bar, the arrangement being such that actuation of the rod in one direction sequentially engages said locators and releases said cam slides to engage said clamps with said pallets and also lowers said transfer bar to release said pallets and whereby actuation of said rod in the opposite direction sequentially disengages said locators and moves said cam slides to disengage the same from said plungers whereby to release said clamps from said pallets and also operable to raise said transfer device to engage said pallets.

2. A machine tool having spaced in-line stations and ways extending through said stations, locators in each station engageable with a work carrying pallet in said station to position the same accurately therein, pivoted clamps in said stations engageable with said pallets to hold the same securely in the located position, clamp operating devices beside said clamps including spring actuated cam slides, and plungers actuated by said slides and bearing on said clamps to engage the same with said pallets, a transfer device including a vertically and horizontally movable transfer bar extending through said station engageable with said pallets and operable to move the same from station to station on said ways, spaced bell cranks each arranged with one arm supporting said transfer bar and having cam followers on the other of said arms, cross shafts journaled for rotation in said station, rack and pinion means connecting said cross shafts with said locators, means including eccentric pins in the ends of said cross shafts extending into recesses in said cam slides, said recesses being substantially wider than said pins to provide lost motion connections between said pins and said slides and said pins being operative by rotation of said cross shafts to actuate said slides, and a reciprocable actuator rod extending through said stations having rotary driving connections with said cross shafts and cams engageable with the cam followers of said bell cranks to actuate the same to raise or lower said transfer bar, the arrangement being such that actuation of the rod in one direction sequentially engages said locators and releases said cam slides to engage said clamps with said pallets and also lowers said transfer bar to release said pallets and whereby actuation of said rod in the opposite direction sequentially disengages said locators and moves said cam slides to disengage the same from said plungers whereby to release said clamps from said pallets and also operable to raise said transfer device to engage said pallets.

3. A machine tool having spaced in-line stations and ways extending through said stations, locators in each station engageable with a work carrying pallet in said station to position the same accurately therein, pivoted clamps in said stations engageable with said pallets to hold the same securely in the located position, clamp operating devices beside said clamps including spring actuated cam slides, and plungers actuated by said slides and bearing on said clamps to engage the same with said pallets, a transfer device including a vertically and horizontally movable transfer bar extending through said stations engageable with said pallets and operable to move the same from station to station on said ways, spaced bell cranks each arranged with one arm supporting said transfer bar and having cam followers on the other of said arms, cross shafts journaled for rotation in each station operatively connected with said locators and with the cam slides of said clamp operating devices, and a reciprocable actuator rod extending through said stations having rotary driving connections with the cross shafts in said stations and cams engageable with the cam followers of said bell cranks to actuate the same to raise or lower said transfer bar, the arrangement being such that actuation of the rod in one direction sequentially engages said locators and releases said cam slides to engage said clamps with said pallets and also lowers said transfer bar to release said pallets and whereby actuation of said rod in the opposite direction sequentially disengages said locators and moves said cam slides to disengage the same from said plungers whereby to release said clamps from said pallets and also operates to raise said transfer device to engage said pallets.

4. A machine tool having spaced in-line stations and ways extending through said stations, locators in each station engageable with a work carrying pallet in said station to position the same accurately therein, pivoted clamps in said stations engageable with said pallets to hold the same securely in the located position, clamp operating devices beside said clamps including spring actuated cam slides, and plungers actuated by said slides and bearing on said clamps to engage the same with said pallets, a transfer device including a vertically and horizontally movable transfer bar extending through said stations engageable with said pallets and operable to move the same from station to station on said ways, actuators for raising and lowering said transfer bar, a cross shaft journaled for rotation in each station, rack and pinion means connecting the cross shaft in each station with the locators in said station, means including eccentric pins in the ends of each cross shaft extending into recesses in said cam slides and operative by rotation of said cross shaft to actuate said cam slides, said recesses being elongate and substantially wider than said pins to provide lost motion connections between said pins and said cam slides and being angularly disposed to actuate said cam slides in predetermined sequential relation with respect to said locators, and a reciprocable actuator rod extending through said station having rotary driving connections with the cross shafts in said stations and also operatively connected mechanically to the actuators for said transfer bar, the arrangement being such that actuation of the rod in one direction sequentially engages said locators and releases said cam slides to engage said clamps with said pallets and also lowers said transfer bar to release said pallets and whereby actuation of said rod in the opposite direction sequentially disengages said locators and moves said cam slides to disengage the same from said plungers whereby to release said clamps from said pallets and also operable to raise said transfer device to engage said pallets.

5. A machine tool having spaced in-line stations and ways extending through said stations, locators in each station engageable with a work carrying pallet in said station to position the same accurately therein, pivoted clamps in said stations engageable with said pallets to hold the same securely in the located position, clamp operating devices besides said clamps including spring actuated cam slides, and plungers actuated by said slides and bearing on said clamps to engage the same with said pallets, a transfer device including a vertically and horizontally movable transfer bar extending through said stations engageable with said pallets and operable to move the same from station to station on said ways, actuators for raising and lowering said transfer bar, a cross shaft journaled for rotation in each station, rack and pinion means connecting the cross shaft in each station with the locators in said station, means including eccentric pins in the ends of each cross shaft extending into recesses in said cam slides, said recesses being substantially wider than said pins to provide lost motion connections between said pins and said slides and said pins being operative by rotation of said cross shaft to actuate said slides, and a reciprocable actuator rod extending through said stations having rotary driving connections with the cross shafts in said stations and also operatively connected mechanically to the actuators for said transfer bar, the arrangement being such that actuation of the rod in one direction sequentially engages said locators and releases said cam slides to engage said clamps with said pallets and also lowers said transfer bar to release said pallets and whereby actuation of said rod in the opposite direction sequentially disengages said locators and moves said cam slides to disengage the same from said plungers whereby to release said clamps from said pallets and also operable to raise said transfer device to engage said pallets.

6. A machine tool having spaced in-line stations and ways extending through said stations, locators in each station engageable with a work carrying pallet in said station to position the same accurately therein, pivoted clamps in said stations engageable with said pallets to hold the same securely in the located position, clamp operating devices beside said clamps including spring actuated cam slides, and plungers actuated by said slides and bearing on said clamps to engage the same with said pallets, a transfer device including a vertically and horizontally movable transfer bar extending through said stations engageable with said pallets and operable to move the same from station to station on said ways, actuators for raising and lowering said transfer bar, cross shafts journaled for rotation in said stations, means operatively connecting said cross shafts with said locators, means including eccentric pins at the ends of said cross shafts operatively connecting the same with the cam slides of said clamp sliding devices, and a reciprocable actuator rod extending through said stations having rotary driving connections with the cross shafts in said stations and also operatively connected mechanically to the actuators for said transfer bar, the arrangement being such that actuation of the rod in one direction sequentially engages said locators and releases said cam slides to engage said clamps with said pallets and also lowers said transfer bar to release said pallets and whereby actuation of said rod in the opposite direction sequentially disengages said locators and moves said cam slides to disengage the same from said plungers whereby to release said clamps from said pallets and also operates to raise said transfer device to engage said pallets.

7. A machine tool having spaced in-line stations and ways extending through said stations, locators in each station engageable with a work carrying pallet in said station to position the same accurately in the station, clamp means in each station engageabel with a pallet in said station to hold the same securely in the located position, a transfer device including a vertically and horizontally movable transfer bar extending through said stations engageable with said pallets and operable to move the same from station to station on said ways, actuators for raising and lowering said transfer bar, at least one cross shaft journaled for rotation in each of said stations, rack and pinion means connecting the cross shaft in each station with the locators in said station and means including eccentric pins in the ends of each cross shaft operatively connecting said shaft with the clamp means of the station in which said cross shaft is situated, whereby actuation of said rod in one direction sequentially engages said locators and said clamp means with said pallets and also lowers said transfer bar to release said pallets and whereby actuation of said rod in the opposite direction sequentially disengages said locators and said clamps from said pallets and also raises said transfer bar to engage said pallets.

8. A machine tool having spaced in-line stations and ways extending through said stations, locators in each station engageable with work carrying pallets to position the same accurately in said station, clamp means in each station engageable with a pallet in said station to hold the same securely in the located position, a transfer device including a vertically and horizontally movable transfer bar extending through said stations engageable with said pallets and operable to move the same from station to station on said ways, spaced bell cranks each arranged with one arm supporting said transfer bar and having cam followers on the other of said arms, at least one cross shaft journaled for rotation in each of said stations operatively connected with said locators and with said clamp means, and a reciprocable actuator rod extending through said stations and having rotary driving connections with the cross shafts in said stations and cams engageable with the cam followers of said bell cranks to actuate the same to raise or lower said transfer bar, whereby actuation of said rod in one direction sequentially engages said locators and said clamp means with said pallets and also lowers said transfer bar to release said pallets and whereby actuation of said rod in the opposite direction sequentially disengages said locators and said clamps from said pallets and also raises said transfer bar to engage said pallets.

9. A machine tool having spaced in-line stations and ways extending through said stations, locators in each station engageable with a work carrying pallet in said station to position the same accurately therein, pivoted clamps in said stations engageable with said pallets to hold the same securely in the located position, clamp operating devices beside said clamps including spring actuated cam slides, and plungers actuated by said slides and bearing on said clamps to engage the same with said pallets, a transfer device including a vertically and horizontally movable transfer bar extending through said stations engageable with said pallets and operable to move the same from station to station on said ways, actuators for raising and lowering said transfer bar, a cross shaft journaled for rotation in each station operatively connected with said locators and with the cam slides of said clamp operating devices, and a reciprocable actuator rod extending through said stations having rotary driving connections with the cross shafts in said stations and also operatively connected mechanically to the actuators for said transfer bar, the arrangement being such that actuation of the rod in one direction sequentially engages said locators and releases said cam slides to engage said clamps with said pallets and also lowers said transfer bar to release said pallets and whereby actuation of said rod in the opposite direction sequentially disengages said locators and moves said cam slides to disengage the same from said plungers whereby to release said clamps from said pallets and also operable to raise said transfer device to engage said pallets.

10. A machine tool having spaced in-line stations and ways extending through said stations, locators in each station engageable with a work carrying pallet in said station to position the same accurately therein, clamps in each station engageable with a pallet in said station to hold the same securely in the located position, clamp operating devices normally operable to hold said clamps engaged with said pallets, a transfer device including a vertically and horizontally movable transfer bar extending through said stations engageable with said pallets and operable to move the same from station to station on said ways, actuators for raising and lowering said transfer bar, a cross shaft journaled for rotation in each station operatively connected directly with said locators and with said clamp operating devices through a lost motion connection, and a reciprocable actuator rod extending through said stations and having rotary driving connections with the cross shafts in said stations and also operatively connected mechanically to the actuators for said transfer bar, whereby actuation of said rod in one direction sequentially engages said locators and releases said clamp operating devices for engagement of said clamps with said pallets and also lowers said transfer bar to release said pallets and whereby actuation of said rod in the opposite direction sequentially disengages said locators and disables said clamp operating devices to release said clamps from said pallets and also raises said transfer bar to engage said pallets.

11. A machine tool having spaced in-line stations and ways extending through said stations, locators in said stations engageable with work carrying pallets to position the same accurately in said station, clamp means in each station engageable with a pallet in said station to hold the same securely in the located position, a transfer device including a vertically and horizontally movable transfer bar extending through said stations engageable with said pallets and operable to move the same from station to station on said ways, actuators for raising and lowering said transfer bar, at least one cross shaft journaled for rotation in each of said stations, means operatively connecting said cross shaft and said locators, means operatively connecting said cross shaft and said clamp means including a lost motion drive for actuating said clamps to engage said pallets after engagement of the latter by said locators, and a reciprocable actuator rod extending through said stations and having rotary driving connections with the cross shafts in said stations and also operatively connected mechanically to the actuators for said transfer bar whereby actuation of said rod in one direction sequentially engages said locators and said clamp means with said pallets and also lowers said transfer bar to release said pallets, and whereby actuation of said rod in the opposite direction sequentially disengages said locators and said clamps from said pallets and also raises said transfer bar to engage said pallets.

12. A machine tool having spaced in-line stations and ways extending through said stations, locators in each station engageable with work carrying pallets to position the same accurately in said station, clamp means in each station engageable with a pallet in said station to hold the same securely in the located position, a transfer device including a vertically and horizontally movable transfer bar extending through said stations engageable with said pallets and operable to move the same from station to station on said ways, actuators for raising and lowering said transfer bar, at least one cross shaft journaled for rotation in each of said stations operatively connected with said locators and with said clamp means, a reciprocable actuator rod extending through said stations and having rotary driving connections with the cross shafts in said stations, and means operatively connecting said actuator rod mechanically to the actuators for said transfer bar, whereby actuation of said rod in one direction sequentially engages said locators and said clamp means with said pallets and also lowers said transfer bar to release said pallets, and whereby actuation of said rod in the opposite direction sequentially disengages said locators and said clamps from said pallets and also raises said transfer bar to engage said pallets.

13. A machine tool having a work station and means for supporting work in said station, a transfer device having a transfer bar movable vertically into and out of engagement with work in the machine, said transfer bar also being movable horizontally in one direction when in engagement with the work to move the same into or out of said station and being movable horizontally in the other direction when disengaged from said work, locators in said work station engageable with said work to position the latter accurately in the station, clamp means engageable with said work to hold the same securely in said station, and a single movable actuator means coactive with said transfer device, said locators and said clamp means and operative by a single motion thereof in one direction to engage said locators and said clamps with said work and to drop said transfer bar vertically away from said work and being further operative by a single motion thereof in the opposite direction to perform said operations in reverse order.

14. A machine tool comprising a work station having ways extending therethrough on which work means is supported in said station and on which said work means travels into and out of said station, a transfer device including a vertically and horizontally movable transfer bar, said bar adapted in a raised position to engage work means in said station preparatory to movement thereof out of said station, movable locators engageable with work means in said station to position the same accurately, movable clamps engageable with said work means to hold the same securely in said station, a reciprocable actuator, rack and pinion means connecting said actuator and said locators operative by a first increment of motion of said actuator in one direction to engage said locators with work in said station, lost motion connections between said actuator and said clamps operative by a latter increment of motion of said actuator in said one direction to engage said clamps with previously located work in the station, and means including a bell crank engageable with said transfer bar to raise and lower the same and cam means on said actuator engageable with said bell crank during motion of said actuator in said one direction to lower said transfer bar out of engagement with work means in said station, said rack and pinion means, said lost motion connections and said last mentioned means being further operative by reverse actuation of the actuator to operate said transfer bar, said clamps and said locators in reverse order.

15. A machine tool comprising a work station having ways extending therethrough on which work means is supported in said station and on which work means travels into and out of said station, transfer means including a vertically and horizontally movable transfer bar, said transfer bar being engageable with said work means when in a raised position and adapted by successive horizontal movements when in a raised position to move work means into and out of said station, movable locators engageable with work means in said station to position the same accurately, movable clamps engageable with said work means to hold the same securely in said station, a reciprocable actuator, rack and pinion means connecting said actuator to said locators and operable during a first increment of motion of said actuator in one direction to engage said locators with work means in said station, means connecting said actuator and said clamps operative during a later increment motion of said actuator in said one direction to engage said clamps with previously located work means in said station, and means including a cam on said actuator and cam actuated means supporting said transfer bar operative during motion of said actuator in said one direction to lower said transfer bar out of engagement with work means preparatory to horizontal sliding movement of said bar to an initial position, said rack and pinion means, said connecting means and said last mentioned means being further operative by a single motion of said actuator in the opposite direction to reverse the operating sequence of said transfer bar, said clamps and said locators.

16. A machine tool comprising a work station, transfer means adapted by successive operations to move work means into said station and out of said station, movable locators engageable with work means in said station to position the same accurately, movable clamps engageable with said work means to hold the same securely in said station, a reciprocable actuator, means coacting with said actuator and said locators during a first increment of motion of said actuator in one direction to engage said locator with work means in said station, means coacting with said actuator and said clamps during a later increment of motion of said actuator in said one direction to engage said clamps with previously located work means in said station, and means including a cam on said actuator and cam actuated means for moving said transfer means into and out of engagement with said work means in said station operative during motion of said actuator in said one direction to disengage said transfer means from said work, said actuator being further operative by a single motion thereof in a reverse direction to perform said operations with said locators, said clamps and said transfer means in reverse order.

17. In a machine tool having a work station, transfer means adapted by successive operations to move work means into said station and out of said station, movable locators engageable with work means in said station to position the same accurately, movable clamps engageable with said work means to hold the same securely in said station, a single actuator movable in two directions, means coacting with said actuator and said locators during a first increment of motion of said actuator in one direction to engage said locators with said work means, means coacting with said actuator and said clamps during an intermediate increment of motion of said actuator in said one direction to engage said clamps with previously located work means, and means coacting with said actuator and said transfer means during a final increment of motion of said actuator in said one direction to disengage said transfer means from said work means, said actuator and said last mentioned means being operative by a single motion of said actuator in said other direction to perform the above operations with said locators, said clamps and said transfer means in reverse order.

References Cited in the file of this patent

UNITED STATES PATENTS

| | | |
|---|---|---|
| 2,559,369 | Phillips | July 3, 1951 |
| 2,570,589 | Phillips | Oct. 9, 1951 |
| 2,745,167 | Cross | May 15, 1956 |
| 2,771,172 | Bergstrand | Nov. 20, 1956 |
| 2,850,141 | Bishop | Sept. 2, 1958 |
| 2,873,513 | Carlzen | Feb. 17, 1959 |
| 2,995,233 | Peras | Aug. 8, 1961 |